United States Patent
Gattu et al.

(10) Patent No.: US 9,986,098 B1
(45) Date of Patent: May 29, 2018

(54) PHONE DIALER SELECTION TOOL (71) Applicant: Bank of America Corporation, Charlotte, NC (US)

(72) Inventors: Phani Raj Gattu, Hyderabad (IN); Balamurali Lakshminarayanan, Chennai (IN); Venkateswar Rao Nerella, Hyderabad (IN); Srinath Nelakuditi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days. days.

(21) Appl. No.: 15/397,064

(22) Filed: Jan. 3, 2017

(51) Int. Cl.
*H04M 3/523* (2006.01)
*H04M 3/51* (2006.01)

(52) U.S. Cl.
CPC ....... *H04M 3/5235* (2013.01); *H04M 3/5158* (2013.01); *H04M 3/5191* (2013.01); *H04M 2203/551* (2013.01)

(58) Field of Classification Search
None
See application file for complete search history.

(56) References Cited

U.S. PATENT DOCUMENTS

| | | | |
|---|---|---|---|
| 6,185,543 B1 | 2/2001 | Galperin et al. | |
| 8,386,378 B2 | 2/2013 | Halper et al. | |
| 8,401,950 B2 | 3/2013 | Lyons et al. | |
| 8,489,499 B2 | 7/2013 | Yan et al. | |
| 9,426,281 B1 * | 8/2016 | McDaniel | H04M 3/22 |
| 2003/0138088 A1 * | 7/2003 | Costrell | H04M 3/42 379/207.15 |
| 2012/0230483 A1 * | 9/2012 | Bouzid | H04M 3/5158 379/201.02 |

* cited by examiner

*Primary Examiner* — Harry S Hong
(74) *Attorney, Agent, or Firm* — Michael A. Springs (57) ABSTRACT

A method comprises receiving a first request from a source, the first request comprising an identification of a first person, a source of the first request, and an indicator whether the first person is currently available for communication. The method further comprises assigning a weight to each of the identification of the person, the source, and the indicator whether the first person is currently available for communication, wherein the assigned weights are based on historical data about the first person and summing each of the assigned weights to produce a prioritization factor. The method further comprises sending the first request to a first telephone dialer if the prioritization factor for the first request is above or equal to a threshold and sending the first request to a second telephone dialer if the prioritization factor for the first request is below the threshold.

20 Claims, 4 Drawing Sheets

FIG. 4

PHONE DIALER SELECTION TOOL

TECHNICAL FIELD

This disclosure relates generally to call centers. More specifically, this disclosure relates to selecting telephone dialers of a call center.

BACKGROUND

Generally, call centers process phone calls on a first-in-first-out ("FIFO") basis. As a result, a call center allocates resources (e.g., telephone operators) according to the received time of each call request. As an example, a first caller who submits a call request will be served before a second caller who submits a call request at a later time.

SUMMARY OF THE DISCLOSURE

According to one embodiment, a phone dialer selection tool comprising a network interface and an assessment engine. The network interface is configured to receive a first request from a source, wherein the first request comprises an identification of a first person, a source of the first request, and an indicator whether the first person is currently available for communication. The identification of a the first person comprises one or more of a phone number of the first person, an email address of the first person, a fax number of the first person, and a geographic location of the first person. The source of the first request is one or more of a phone call, an instant message, an email, and a website submission. The assessment engine is configured to assign a weight to each of the identification of the person, the source, and the indicator whether the first person is currently available for communication, wherein the assigned weights are based on historical data about the first person, and sum each of the assigned weights to produce a prioritization factor. The assessment engine is further configured to send the first request to a first telephone dialer if the prioritization factor for the first request is above or equal to a threshold and send the first request to a second telephone dialer if the prioritization factor for the first request is below the threshold.

According to another embodiment, a method comprises receiving a first request from a source, the first request comprising an identification of a first person, a source of the first request, and an indicator whether the first person is currently available for communication. The identification of the first person comprises one or more of a phone number of the first person, an email address of the first person, a fax number of the first person, and a geographic location of the first person and the source of the first request is one or more of a phone call, an instant message, an email, and a website submission. The method further comprises assigning a weight to each of the identification of the person, the source, and the indicator whether the first person is currently available for communication, wherein the assigned weights are based on historical data about the first person, and summing each of the assigned weights to produce a prioritization factor. The method further comprises sending the first request to a first telephone dialer if the prioritization factor for the first request is above or equal to a threshold and sending the first request to a second telephone dialer if the prioritization factor for the first request is below the threshold.

According to another embodiment, one or more computer readable non-transitory storage media embodying software that is operable when executed to receive a first request from a source, the first request comprising an identification of a first person, a source of the first request, and an indicator whether the first person is currently available for communication. The identification of the first person comprises one or more of a phone number of the first person, an email address of the first person, a fax number of the first person, and a geographic location of the first person, and the source of the first request comprises one or more of a phone call, an instant message, an email, and a website submission. The software is further operable when executed to assign a weight to each of the identification of the person, the source, and the indicator whether the first person is currently available for communication, wherein the assigned weights are based on historical data about the first person, and sum each of the assigned weights to produce a prioritization factor. The software is further operable when executed to send the first request to a first telephone dialer if the prioritization factor for the first request is above or equal to a threshold and send the first request to a second telephone dialer if the prioritization factor for the first request is below the threshold.

Certain embodiments may provide one or more technical advantages. For example, an embodiment of the present disclosure may improve the telephone dialer selection capabilities of a call center. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 4 of the drawings, like numerals being used for like and corresponding parts of the various drawings.

A call center implementing a first-in-first-out (FIFO) policy allocates resources based on the received time of each call request. Generally, the first received call request will be handled first. Although a FIFO resource allocation scheme may be beneficial in some circumstances, it may not be beneficial in all circumstances. Rather, it may be beneficial for a call center to respond based on factors other than a time that a call request was received. For example, it may be beneficial for a call center to prioritize certain call requests over other call requests based on situational factors such as an urgency of a call request, a status of a caller, or another suitable situational factor or combination of situational factors.

Consider the following: a first caller submits a call request seeking information about a service or product offering of a service and/or product provider and a second caller submits a call request to report a lost/stolen credit card, a travel emergency, or some other imminent situation. Based on a FIFO policy, the first caller would be served before the second caller even though the second caller is experiencing a situation of a more dire nature than the first caller. As another example, a first caller may submit a call request for information about a service or product offering of the service and/or product provider and a third caller may be a long-time customer of the service and/or product provider who pays a premium for high-level service. In such an example, FIFO policy would dictate that the first caller be served before the second caller. In other words, a rigid FIFO policy implemented by a call center does not direct call requests based on anything other than the order in which calls are received. As a result, in many cases, service and/or product providers must employ two or more call centers (e.g., a call center to handle prospective customer-related call requests and a call center to handle existing customer call requests).

This disclosure contemplates a phone dialer selection tool that responds to call requests based on a prioritization factor (e.g., rather than a time of a call request). The prioritization factor may, in some embodiments, correspond to a predicted probability that a particular caller should be serviced prior to a different caller. The phone dialer selection tool may direct a call request to first phone dialer when the prioritization factor is above a threshold and direct the call request to a second phone dialer when the prioritization factor is below the threshold. In some embodiments, the first phone dialer is technologically better than the second dialer. For example, the first phone dialer may be associated with a faster connection time and/or a faster dialing time relative to the second dialer. In such an example, phone dialer selection tool may direct call requests to the first phone dialer when it determines that the call request should be handled as quickly as possible and direct call requests to the second phone dialer when it determines that the call request need not be handled as quickly as possible. Stated differently, the phone dialer selection tool may determine that a particular phone dialer is more appropriate than another phone dialer to respond to a call request (e.g., if phone dialer selection tool predicts that the call request is urgent, it will direct the call request to the phone dialer that can establish a call the quickest). Accordingly, the phone dialer selection tool does not respond to call requests based on a time associated with a call request (as is done under the FIFO policy); rather the phone dialer selection tool responds to call requests based on a calculated prioritization factor relative to a threshold. In particular embodiments, the phone dialer selection tool improves the response time and response capabilities of a call center.

Figure 1:
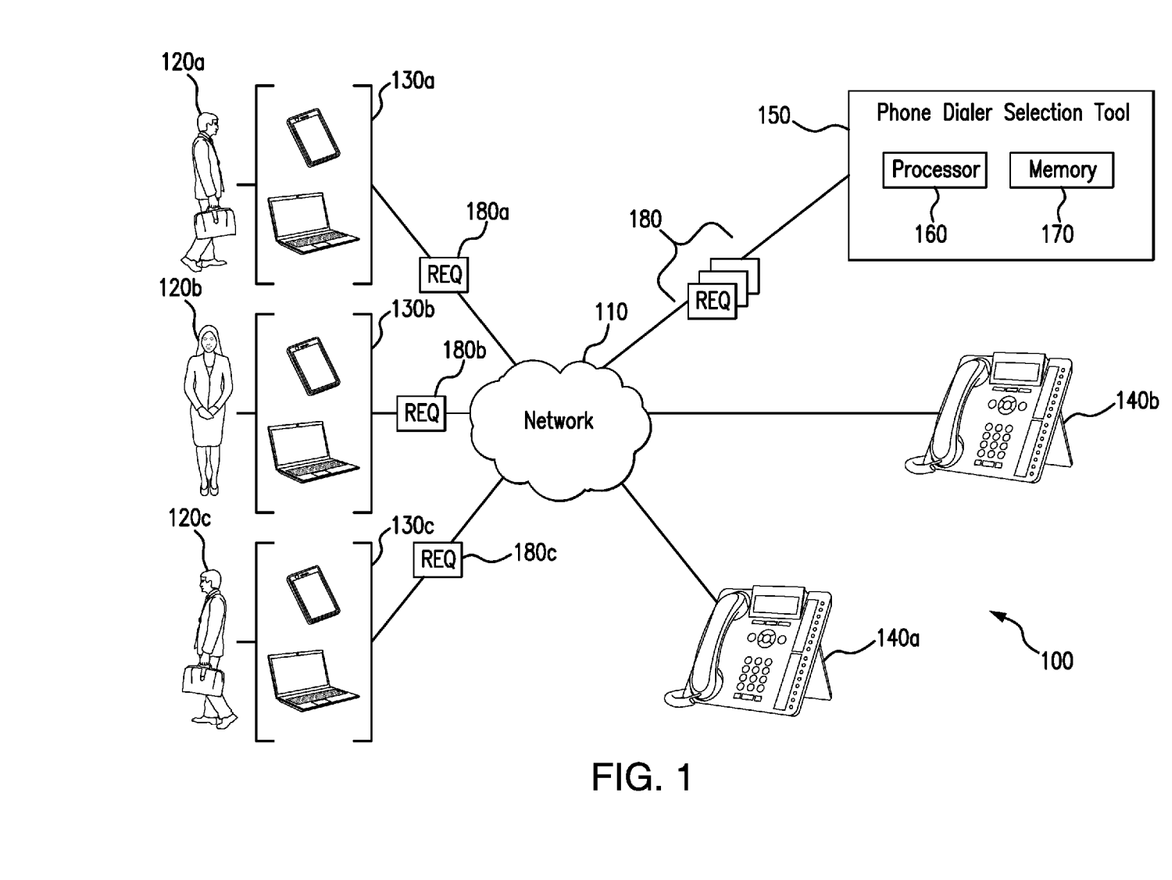
FIG. 1 is a block diagram illustrating a system for allocating resources of a call center using a phone dialer selection tool, according to certain embodiments.

FIG. 1 illustrates a system 100 for prioritizing requests of users 120 using a phone dialer selection tool 150. As illustrated in FIG. 1, system 100 includes a network 110, one or more users 120, devices 130, one or more phone dialers 140, and a phone dialer selection tool 150. Generally, phone dialer selection tool 150 receives call requests 160 from users 120 and directs each call request 180 to a phone dialer 140 based on a determined prioritization factor.

Network 110 may facilitate communication between and amongst components of system 100. This disclosure contemplates network 110 being any suitable network operable to facilitate communication between the components of system 100. For example, network 110 may permit users 120 to send call requests 180 to phone dialer selection tool 150 over network 110. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As described above, system 100 may include one or more users 120 in some embodiments. As depicted in FIG. 1, network 110 comprises three users 120a, 120b, and 120c. As is also depicted in FIG. 1, each user 120 is associated with one or more devices 130. For example, user 120a is associated with devices 130a, user 120b is associated with devices 130b and user 120c is associated with devices 130c. In some embodiments, users 120 use devices 130 to send call requests 160 over network 110. In some embodiments, requests 160 comprise a request to speak to an operator (e.g., an operator at a call center) regarding a product or service offered by a product or service provider.

As an example, user 120a may submit request 180a because he or she seeks information about a product or service of a product or service provider. In contrast, user 120b may submit request 180b because he or she is experiencing a problem with a product or service of a product or service provider. Finally, user 120c may submit a request 180C because he or she has lost a product or service offered by a product or service provider. Although specific examples of users 120 and requests 160 have been described, this disclosure recognizes that a request 180 may be any suitable request from user 120. In some embodiments, a request 180 is submitted via a computer. For example, user 120a may use a computer 140 to submit request 180a. In other embodiments, a request 180 is submitted via a phone 130. As an example, user 120b may call a service or product provider to submit request 180b. This disclosure recognizes that request 180 may be submitted in any suitable manner including phone calls and/or online requests.

This disclosure contemplates device 130 being any appropriate device that can communicate over network 110. For example, device 130 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 130 may also include a user interface, such as a display, a microphone, keypad, or other appropriate terminal equipment usable by a user. In some embodiments, an application executed by device 130 may perform the functions described herein.

System 100 also includes phone dialer selection tool 150 in some embodiments. As described above, phone dialer selection tool 150 is configured to receive request 180 and direct each request to a specific phone dialer 140. In some embodiments, determining whether to send a request 180 to a particular phone dialer 140 is based on a prioritization factor. The functions of phone dialer selection tool 150 will be described in further detail below in reference to FIG. 2. As illustrated in FIG. 1, phone dialer selection tool 150 comprises a processor 160 and a memory 170. Processor 160 may be configured to execute various algorithms implemented by various modules of phone dialer selection tool 150 (e.g., network interface 210, assessment engine 220, verification engine 230, and update engine 240). In some embodiments, phone dialer selection tool may also comprise memory 170. As will be described in more detail below, memory 170 may comprise weights corresponding to a plurality of sources 170a, weights corresponding to a plurality indicators 170b, historical data (170c-e), and a threshold 170f. Although this disclosure describes and depicts phone dialer selection tool 150 comprising memory 170, this disclosure recognizes that phone dialer selection tool 150 may not include memory 170 in some embodiments. For example, memory 170 may be a stand-alone component or part of a component connected to network 110 and be accessible to phone dialer selection tool 150 via network 110. In some embodiments, phone dialer selection tool 150 may be a program executed by a computer system. As an example, phone dialer selection tool 150 may be executed by a computer such as computer 400 described below in reference to FIG. 4. In such example, memory 170 maybe memory 420 and processor 160 may be processor 410 of computer 400.

Figure 2:
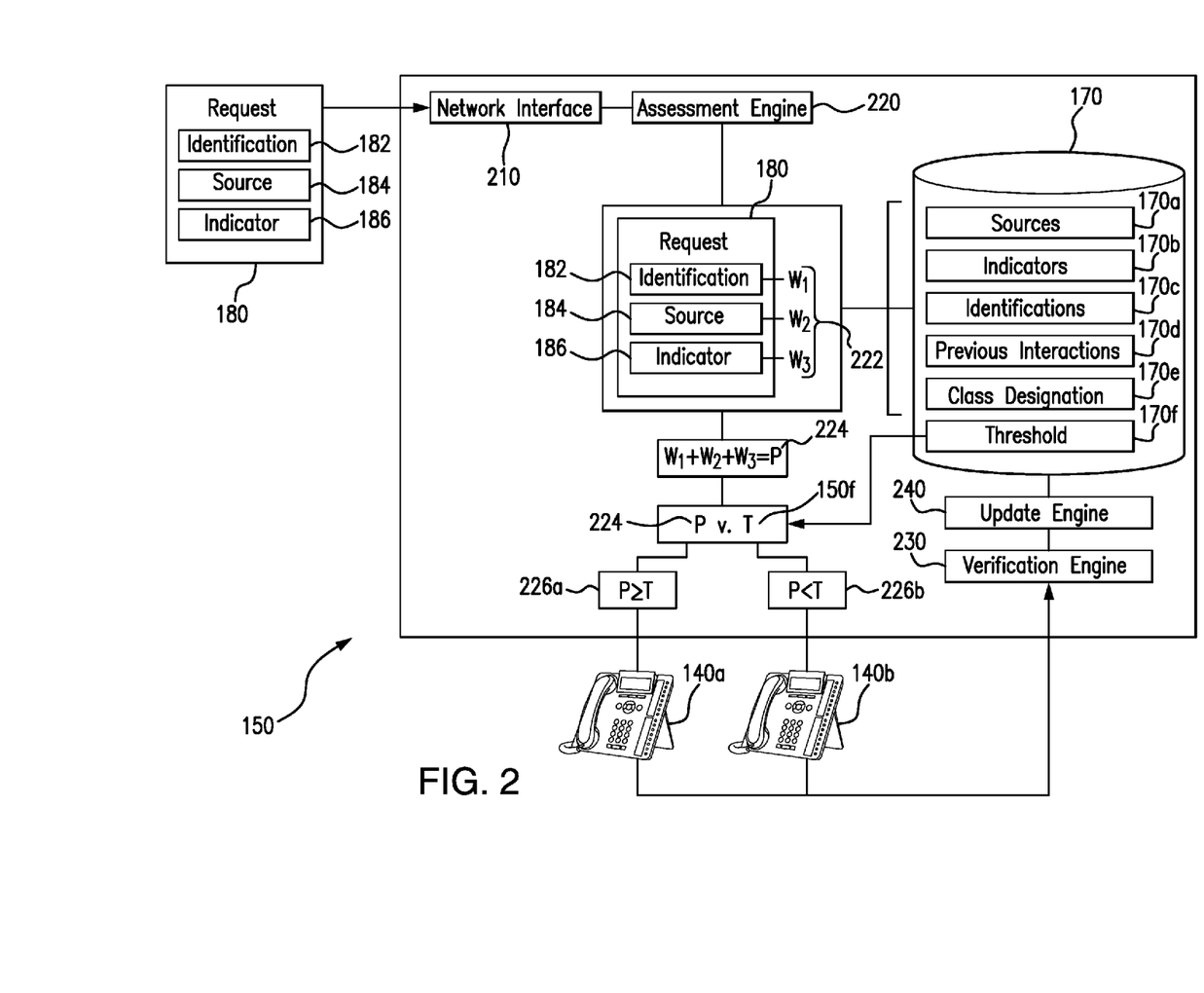
FIG. 2 is a block diagram illustrating the phone dialer selection tool of FIG. 1, according to certain embodiments.
Figure 3:
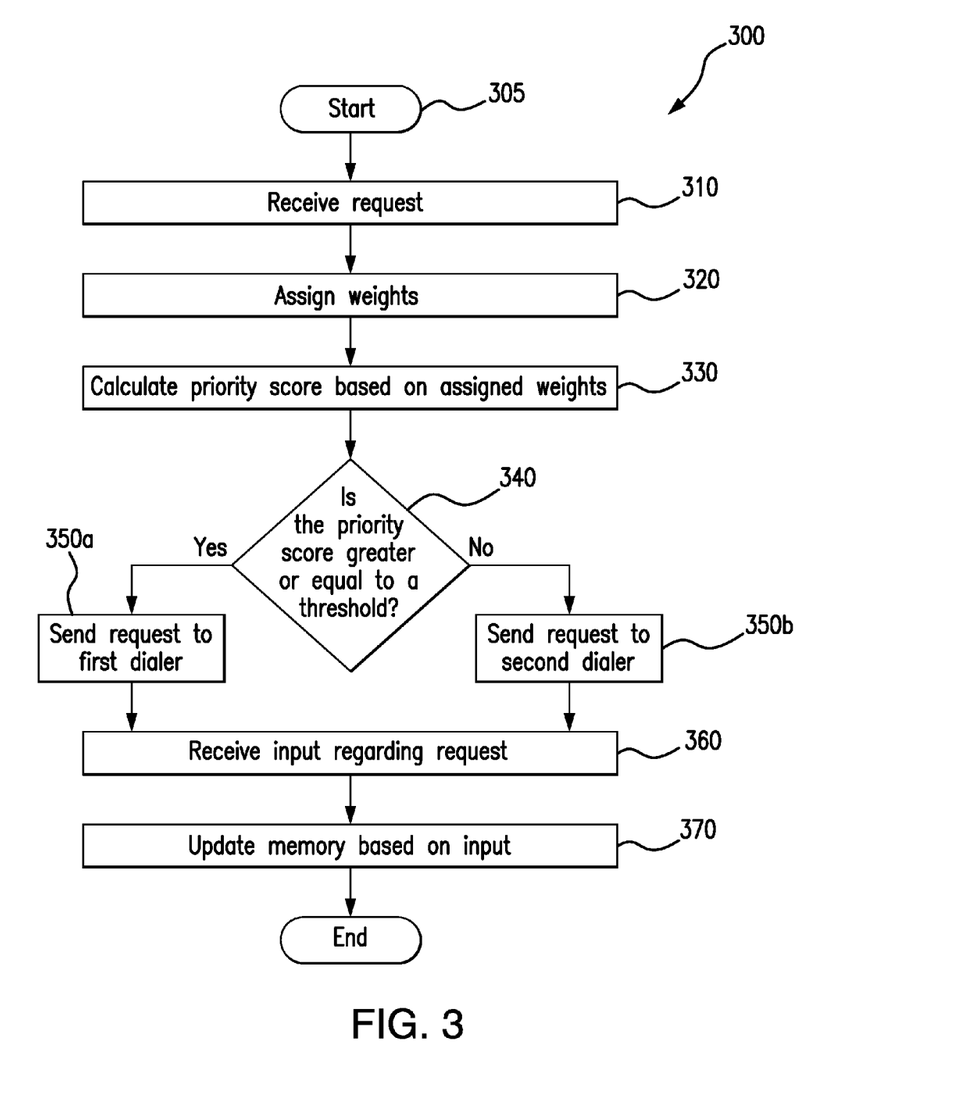
FIG. 3 is a flow chart illustrating a method for allocating resources of a call center using the phone dialer selection tool of FIG. 2, according to one embodiment of the present disclosure.
Figure 4:
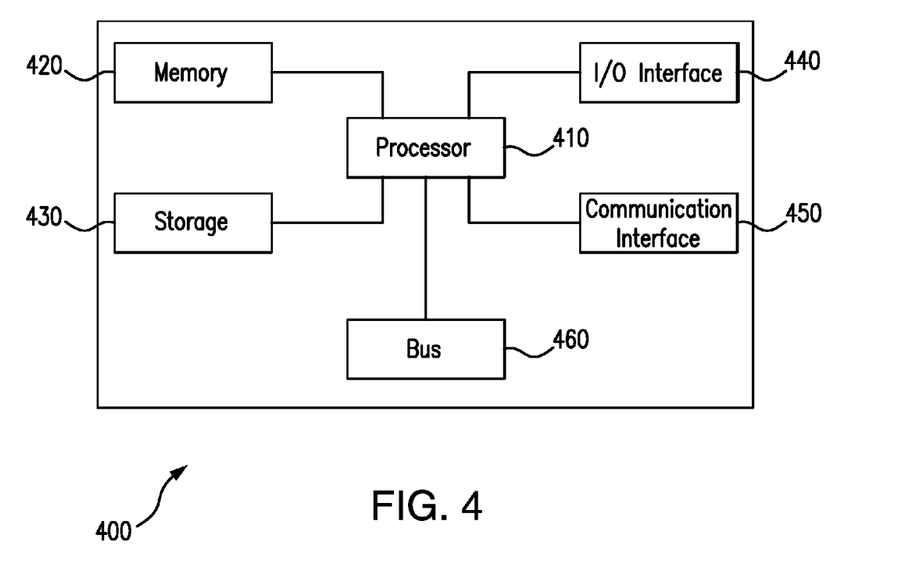
FIG. 4 is a block diagram illustrating a computer configured to implement the method of FIG. 3, according to certain embodiments.

Generally, FIG. 1 illustrates that phone dialer selection tool 150 receives one or more requests 160 from users 120. Phone dialer selection tool 150 may evaluate request 180 and determine, for each request 180, whether to send request 180 to a particular phone dialer 140. FIG. 2 illustrates phone dialer selection tool 150 in greater detail and FIG. 3 illustrates a method of directing a call request using phone dialer selection tool 150. Finally, FIG. 4 illustrates an example of a computer 400 that may be configured to run phone dialer selection tool 150.

As described above, phone dialer selection tool 150 receives request 180 and sends requests 160 to phone dialer systems 140 based on a prioritization factor. These functions of phone dialer selection tool 150 may be executed by one or more various modules of phone dialer selection tool 150. For example, as depicted in FIG. 2, phone dialer selection tool 150 may comprise a network interface 210, an assessment engine 220, a verification engine 230, and an update engine 240. In some embodiments, modules 210, 220, 230 and 240 are executable software. In other embodiments, modules 210, 220, 230 and 240 are hardware. In yet other embodiments, modules 210, 220, 230 and 240 are a combination of software and hardware.

Phone dialer selection 150 may comprise or be communicably coupled to memory 170 in some embodiments. Accordingly, the modules of phone dialer selection tool 150 may have access to information (170a-f) stored in memory 170. Memory 170 may store a plurality of sources 170a and a plurality of indicators 170b. In some embodiments, each source and each indicator is assigned a particular weight. For example, memory 170 may store TABLE 1 and TABLE 2 below illustrating sources 170a and indicators 170b and their respective weights:

TABLE 1

| Source | Weight |
| --- | --- |
| Email (3rd Party Platform) | 1 |
| Email (Provider Platform) | 2 |
| Website Message (3rd Party Platform) | 1 |
| Website Message (Provider Platform) | 2 |
| Online Chat Session (3rd Party Platform) | 8 |
| Online Chat Session (Provider Platform) | 9 |

TABLE 1-continued

| Source | Weight |
| --- | --- |
| Phone Call (3rd Party Platform) | 9 |
| Phone Call (Provider Platform) | 10 |

TABLE 2

| Indicator | Weight |
| --- | --- |
| Currently Available | 10 |
| Not Currently Available | 0 |

As depicted in TABLE 1, a request 180 submitted via email or website message may be assigned a low weight (e.g., 1 and 2) and requests 160 submitted via an online chat session or by phone call may be assigned higher weights (8-10). In some embodiments, such as depicted in TABLE 1, weights are further assigned based on whether the source 170a was submitted via a provider's own platform or via a third-party platform. Although this disclosure describes and depicts certain types of sources and assigns example weights to each of the sources, this disclosure recognizes that memory 170 may store any suitable source 170a and assign any suitable weight to the source.

Memory 170 also stores a weight assigned to each of a plurality of indicators 170b in some embodiments. Indicators 170b may correspond to an urgency associated with call request 180. For example, an indicator 170b may indicate whether user 120 is currently available for communication. As depicted in TABLE 2 above, memory 170 stores two indicators: "Currently Available" and "Not Currently Available." These indicators are assigned the weights 10 and 0, respectively. As will be explained in more detail below, phone dialer selection tool 150 may determine an indicator 186 of a call request 180 based on the source 184 of the request 186. For example, phone dialer selection tool 150 may determine that user 120 is currently available for communication when source 184 of request 180 is a phone call or an instant message. In contrast, phone dialer selection tool 150 may determine that user 120 is not currently available for communication when source 184 of request 180 is an email or a website submission.

In a different embodiment, indicator 170b may be based on a condition experienced by user 120. For example, memory 170 may store the following indicators 170b: (1) user seeking information; (2) lost or stolen product or service; and (3) disabled product or service. These indicators may be assigned the weights 1, 10, and 8, respectively. In such an embodiment, phone dialer selection tool 150 may be configured to analyze a call request 180 and determine a reason for a call request (also referred to as a condition experienced by user 120). For example, phone dialer selection tool 150 may analyze request 180a from user 120a and determine, based on the request 180a, that user 120a is seeking information about products or services offered by a product or service provider. In response to determining this user condition, phone dialer selection tool 150 may query indicators 170b stored in memory 170 and assign the weight corresponding to the stored indicator 170b that most closely matches the determined user condition. Assigning of stored weights will be described in more detail below. Although this disclosure describes and depicts particular types of indicators, this disclosure recognizes that memory 170 may store any suitable indicator 170b and assign any suitable weight to the indicator.

In addition to memory 170 storing a plurality of sources 170a and a plurality of indicators 170b, memory 170 may, in some embodiments store historical data. The historical data stored in memory 170 may comprise historical data about one or more users 120. As depicted in FIG. 2, historical data comprises a plurality of identifications 170c, a plurality of records of previous interactions 170d, and a plurality of class designations 170e. The plurality of identifications 170c may comprise an identification of one or more users 120. In some embodiments, memory 170 may also include, for each identification 170c, a record of previous interactions 170d corresponding to that particular user 120 and a particular class designation 170e corresponding to that particular user 120. As an example, memory 170 may store an identification 170c for user 120a. Additionally, memory 170 may store a record of previous interactions 170d corresponding to user 120a. It will also be recognized that memory 170 may store identifications for users 120b and 120c, and therefore also store records of previous interactions 170d and class designations 170e for users 120b and 120c.

An identification 170c may be one or more of a phone number of a user 120, an email address of a user 120, a fax number of a user 120, and a geographic location of a user 120. Identification 170c may also be a name of user 120 in some embodiments. For example, the identification may be a legal name or common name of user 120. Although this disclosure recites particular identifications 170c, this disclosure recognizes that identification 170c may refer to any information that may be used to distinguish one user 120 from another.

As used herein, a record of previous interactions 170d may include information about one or more prior encounters of identification 170c. For example, the record or previous interactions 170d corresponding to an identification 186 associated with user 120b may include a record 170d comprising the following entries: (1) requested information about products or services; (2) signed up for products or services; (3) changed billing information associated with the account; and (4) reported a stolen product or service. In some embodiments, the record of previous interactions 170d may comprise a plurality of entries, a summary, or any other suitable description about prior interactions with a specific user (e.g., user 120a).

Class designation 170e may refer to a class or status assigned to a particular user 120. For example, a service or product provider may have a tiered system such that a user 120 may a be a first tier user (e.g., "gold" user), a second tier user ("silver" user), or a third tier user ("bronze") user, wherein first tier users are provided service or products that are top quality and a third tier user is eligible for basic products or services.

This disclosure recognizes that phone dialer selection tool 150 may have not had any previous encounters with user 120. As such, phone dialer selection tool 150 may not have an identification 170c, a record of previous interactions, and/or a class designation 170e stored in memory 170 that corresponds to the identification 182 provided in the call request 180. In such a scenario, phone dialer selection tool 150 may create historical data entries (170c-e) for the provided identification 182. For example, user 120a may not be an existing customer of a product or service provider and may submit, for the first time, a call request 180a requesting information about products or services offered by the product or service provider. The request 180 comprises an identification (e.g., phone number of user 120a) that does not have a corresponding stored identification 170c in memory 170. Accordingly, phone dialer selection tool 150 may create and store an entry for the provided identification 186 and also create an associated record of previous interactions 170d and class designation 170e for the provided identification 186.

In some embodiments memory 170 also comprises or is also configured to store a threshold 170f. Threshold 170f may be used to determine whether a request 180 should be sent to a particular phone dialer 140. The threshold may be fixed or variable. For example, in some embodiments if a majority of phone calls are being directed to phone dialer 140a, the threshold 170f may be updated (e.g., the threshold may be increased) such that a lesser quantity of phone calls will be directed to phone dialer 140a.

As described above, phone dialer selection tool 150 may comprise a network interface 210. Network interface 210 may be configured to receive a request 180 from a user 120. Each request 180 may comprise an identification 182, a source 184, and an indicator 186. Identification 182 may comprise one or more of a phone number of user 120, an email address of user 120, a fax number of user 120 and a geographic location of the user 120 that submitted the request 180. Although specific examples of identifications have been described, this disclosure recognizes that an identification or that identification 182 may be any suitable identifier or association of user 120. Source 184 may be a source of request 180. As described earlier, a request 180 may be submitted via one or more of a phone call, an instant message, an email and a website submission. Source 184 of request 180 may also indicate whether the source 184 came from a service or product provider itself or from a third party. Request 180 may also comprise an indicator 186 (e.g., an indicator of whether user 120 is currently available).

Generally, network interface 210 is configured to receive a request 180 comprising an identification 182, a source 184, and an indicator 186, and send the request 180 to assessment engine 220. In some embodiments, network interface 210 receives request 180 with the identification 182, a source 184, and the indicator 186 specified with particularity. In other embodiments, network interface 160 may receive a request 180 (e.g., a request with a block of text) and analyze the received request 180 to identify an identification 182, source 184 and indicator 186. In yet other embodiments, network interface 160 merely sends the request 180 to assessment engine 220 as it was received by network interface 210. An example of an algorithm that may be implemented by network interface 210 comprises: (1) receive, from a user 120, a call request 180 comprising an identification 182, a source 184 and an indicator 186; (2) send the received call request to assessment engine 220.

Phone dialer selection tool 150 may also comprise an assessment engine 220 in some embodiments. Generally, assessment engine 220 is configured to analyze request 180 and determine which phone dialer 140 of system 100 to send the analyzed request 180 to. For example, as depicted in FIG. 2, assessment engine 220 evaluates request 180 and determines whether to send request 180 to phone dialer 140a or phone dialer 140b. Although this disclosure describes and depicts system 100 including only two phone dialers 140, this disclosure recognizes that system 100 may include any suitable number of phone dialers 140. Each phone dialer 140 of system 100 may be different from another. For example, phone dialer 140a may exhibit technical improvements relative to phone dialer 140b. Examples of such technical improvements include faster connection times, faster dialing times, and higher voice quality. In some embodiments, phone dialer selection tool 150 sends call requests 180 to phone dialer 140a based on a determination that the call request 180 should be serviced as quickly as possible. Determining whether a call should be serviced as quickly as possible may, in some embodiments, comprise comparing a calculated prioritization factor 224 to a threshold 170f. For example, phone dialer selection tool 150 may direct a call request 180 to first phone dialer 140a when the calculated prioritization factor 224 is above a threshold 170f and direct the call request 180 to a second phone dialer 140b when the calculated prioritization factor 224 is below the threshold.

Generally, assessment engine 220 is configured to assign a weight 222 to the identification 182, a request 180, the source 184 of request 180 and the indicator 186 of request 180. As it is illustrated in FIG. 2, assessment engine 220 assigns a first-weight ($W_1$) 222a to identification 182, assigns a second weight ($W_2$) 222b, to source 184 and assigns a third weight ($W_3$) 222c to indicator 186. In some embodiments, the weights 222 assigned by assessment engine 220 are based on information stored in memory 170. For example, as described above, memory 170 is configured to store plurality of sources 170a wherein each source is assigned a weight 222 (e.g., $W_1$, $W_2$, and $W_3$ of FIG. 2). Thus, if request 180 indicates that the source 184 is a phone call from a provider platform, assessment engine 220 may assign $W_2$ the value of 10 as (see TABLE 1 above). However, if source 184 of request 180 had been an email to a third-party platform, assessment engine 220 may have assigned $W_2$ the value of 1 (see TABLE 1 above). Assessment engine 220 may also assign indicator weights based on information stored in memory 170. For example, if indicator 156 indicates that user 120 is currently available, assessment engine 220 may assign $W_3$ a value of 10 (see TABLE 1 above). In contrast, if assessment engine 220 determines that user 120 is not currently available, assessment engine 220 may assign $W_3$ a value of 0 (see TABLE 1 above).

The weight 222 assigned to identification 182 ($W_1$) may be dynamically assigned by assessment engine 220. In some embodiments, $W_1$ may be based on historical data stored in memory 170. As described above, historical data may comprise one or more of a plurality of identifications, wherein each identification 170c may be associated with a record of previous interactions 170d and/or a class designation 170e. Assessment engine 220 may uses this information to assign a value to $W_1$. As one example, assessment engine 220 may determine that the identification 182 of request 180 does not correspond to an identification 170c stored in memory 170 (and thus no historical data exists for the provided identification). In such a case, assessment engine 220 may assign a value of 0 to $W_1$. In contrast, assessment engine 220 may assign a value of 10 to $W_1$ (e.g., when call volume is low or during an initiative to prioritize prospective customers).

As another example, in response to determining that an identification 182 of request 180 corresponds to an identification 170c stored in memory 170, assessment engine 220 may query memory 170 for the record of previous interactions 170d and/or class designation 170e associated with identification 182. The record 170d may indicate that the user 120 associated with identification 182 has submitted six call requests 180 in less than two weeks and is not satisfied with the product or service offered by the provider. Additionally, the class designation 170e associated with the provided identification 182 may indicate that the user 120 associated with identification 182 is of first-tier status. Assessment engine 220 may assign a value to to $W_1$ in a way that accounts for these various situational factors. For example, assessment engine 220 may assign the value of 25 to $W_1$. The value assigned to $W_1$ may, in some embodiments, correspond to one or more of: a likelihood of retention, a predicted satisfaction of user 120, and a frequency of call requests 180 associated with an identification 170. Although this disclosure describes specific situational factors (which may be based on or interpreted from the record of previous interactions 170d and/or the class designation 170e associated with an identification 170) that may affect the weight assigned to identification 182, this disclosure recognizes that any suitable factor may affect the weight assigned to identification 182.

After assessment engine has assigned weights to identification 182 ($W_1$), source 184 ($W_2$), and indicator 186 ($W_3$) of request 180, assessment engine 220 calculates a prioritization factor 224 (also referred to herein as a "priority") based on the assigned weights. As depicted in FIG. 2, assessment engine 220 sums together the assigned weights ($W_1+W_2+W_3$) in order to calculate prioritization factor 224. As an example, if assessment engine 220 assigns the following weights to request 180a: $W_1=7$; $W_2=1$; $W_3=0$, assessment engine 220 may determine that the prioritization factor 224 is 7 for the received request 180. As another example, assessment engine 220 may determine that the prioritization factor 224 for request 180c is 30 when assessment engine 220 assigns the following weights: $W_1=10$; $W_2=10$; $W_3=10$.

After determining prioritization factor 224, assessment engine 220 may compare the prioritization factor 224 to a threshold. In some embodiments, assessment engine 220 compares prioritization factor 224 to threshold 170f stored in memory 170. As described above, threshold 170f may be fixed or variable. As an example, threshold 170f may vary based on a volume of call requests 180 received by phone dial selection tool 150. In some embodiments, assessment engine 220 determines that prioritization factor 224 is greater or equal to threshold 170f (see 226a of FIG. 2) or may determine that prioritization factor 224 is less than threshold 170f (see 226b of FIG. 2). As depicted in FIG. 2, if assessment engine 220 determines that prioritization factor 224 is greater or equal to threshold 170f, phone dialer selection tool 150 may send the request 180 to phone dialer 140a. However, if assessment engine 220 determines that prioritization factor 224 is less than threshold 170f, phone dialer selection tool 150 may send the request 180 to phone dialer 140b. Although this disclosure describes and depicts directing a call request 180 to a particular phone dialer 140 based on prioritization factor 224 being greater than or equal to (or in contrast, less than) threshold 170f, this disclosure also recognizes that a call request 180 may be directed to a particular phone dialer 140 based on prioritization factor 224 being greater than (or in contrast, less than or equal to) threshold 170f.

An example of an algorithm that may be executed by assessment engine 220 is as follows: (1) receive, from network interface 210, a call request 180 comprising an identification 182, a source 184, and an indicator 184; (2) assign a weight (W1) to identification 182 of request 180 based on historical data (e.g., 170c-e) stored in memory 180; (3) assign a weight (W2) to source 184 of request 180 based on the weight assigned to each of the plurality of sources 170a stored in memory 170; (3) assign a weight (W3) to indicator 186 of request 180 based on the weight assigned to each of the plurality of indicators 170b stored in memory 170; (4) calculate a prioritization factor 224 for request 180 by summing together each assigned weight; (5) compare the calculated prioritization factor 224 to a threshold 170f; and (6) send the call request 180 to a first dialer 140a if the prioritization factor 224 is greater than or equal to threshold 170f and send the call request 170 to a second dialer 140b if the prioritization factor 224 is less than threshold 170f. Using this algorithm, assessment engine 220 directs call requests 180 based on determined prioritization factor 224 rather than a time of a call request 180. Stated differently, assessment engine 220 does not send a call request 180 to a particular phone dialer 140 based on a time that the call request 180 was received. Moreover, assessment engine 220 does not send a first call request 180 to a phone dialer 140 based on a time that the first request 180 was received relative to a time that a second request was received. Accordingly, this disclosure recognizes not allocating resources based on a FIFO policy.

As described above, phone dialers 140 may be used to communicate with users 120 regarding their call request 180. A phone dialer 140 may differ from another phone dialer 140 in one or more ways. In some embodiments, the differences between phone dialers 140 make one phone dialer (e.g., 140a) more preferable than another (e.g., 140b). For example, in some embodiments, phone dialer 140a may be associated with a better quality of service than phone dialer 140b (e.g., faster connection times, faster dialing times, better voice quality, etc.). In some embodiments, phone dialers 140 may be used to submit feedback or input regarding request 180. For example, in some embodiments, phone dialers 140 submit input as to whether the request 180 of user 120 was fulfilled.

In some embodiments, verification engine 230 is the module of phone dialer selection tool 150 that receives the input provided by operators of phone dialers 140. In some embodiments, determining whether the requests 160 was fulfilled, comprises determining whether a call was set up by a phone dialer 140. In other embodiments, verification engine 230 determines that request 180 was fulfilled based on one or more substantive requirements such as whether the user 120's underlying request (e.g., request for information about a product or service, request to remove a hold, request to cancel a lost or stolen credit card) was fulfilled by an operator of a phone dialer 140. In some embodiments verification engine 230 sends the input from phone dialers 140 to an update engine 240. In other embodiments, verification engine 230 transforms the user input before sending the input to update engine 240. For example, verification engine 230 may reformat the input into an acceptable format for storage in memory 170. An example algorithm that may be executed by verification engine 230 is as follows: (1) receive, from one or more phone dialers 140, input regarding a call request 180; (2) determine, from the received input, whether call request 180 was fulfilled; (3) reformat the input into an acceptable format for storage in memory 170; and (4) send the formatted input to update engine 240.

As depicted in FIG. 2, phone dialer selection tool 150 may comprise an update engine 240 in some embodiments. Update engine 240 may be configured to receive input (or reformatted input) and update memory 170 based on the received input (or reformatted input). In some embodiments, update engine 240 updates the historical data (e.g., 170c-e) stored in memory 170. For example, update engine 240 may update the record of previous interactions 170d for the stored identification 170c corresponding to the identification 182 associated with request 180. In other embodiments, update engine 240 updates the class designation 170e for the stored identification 170c corresponding to the identification 182 associated with request 180 (e.g., if user 120 requested an upgrade or downgrade in product or service levels). In yet other embodiments, update engine 240 update one or more of the identification 170c itself, the record of previous interactions 170d for the identification 170 corresponding to the identification 182 of request 180, and the class designation 170e for the identification 170 corresponding to the identification 182 of request 180. As an example, update engine 240 may update the stored identification 170c corresponding to the identification 182 of request 180 (e.g., updating a phone number of user 120, an email address of user 120, a fax number of user 120, a geographic location of user 120). An example algorithm that may be executed by update engine 240 is as follows: (1) receive reformatted input from verification engine 230; and (2) update memory 170 based on the received reformatted input. Although this disclosure describes particular ways of updating memory 170, this disclosure recognizes that update engine 240 may add, delete, and/or modify any information stored in memory 170 based on input from phone dialers 140.

In some embodiments, phone dialer selection tool 150 receives a subsequent request 180 (also referred to herein as a second request) from the same user 120 (e.g., user 120a submits a first call request 180 and, at a later point in time, submits a second call request). In some embodiments, network interface 210 may be configured to receive the second request 180 and assessment engine 220 may be configured to determine a prioritization factor 224 for the second request 180 and send the second request 180 to a phone dialer 140 based on the determined prioritization factor 224 of the second request 180. In some embodiments, phone dialer selection tool 150 analyzes the second request 180 in light of updated historical data (e.g., 170c-e). As a result, phone dialer selection tool assigns weights 222 to the second request based on the source 184 and indicator 186 of the second request, but also on the updated historical data. As an example, the first request of user 120a may be assigned a prioritization factor 224 of 7 and upon evaluating the second request 180 assessment engine 220 may assign the second request a prioritization factor 224 of 18. The difference in the prioritization factor may be based wholly or in part on the updated historical data (e.g., updated by update engine 240). For example, if update engine 240 had updated the class designation 170e associated with the identification corresponding to user 120 such that the user 120 had been associated with a third tier level of service and was increased to a first tier level of service the weight assigned by assessment engine 220 may be more than the weight assigned to the identification of the previous request 180.

FIG. 3 illustrates a method 300 which may be performed by phone dialer selection tool 150. In some embodiments, some or all of the steps of method 300 are performed by one or more modules of phone dialer selection tool 150. The method 300 may begin in a step 305 and continue to a step 310. At step 310, phone dialer selection tool 150 receives a call request 180. The call request may be submitted by a user 120. In some embodiments, the module of phone dialer selection tool 150 that receives the request is network interface 210. The request received at step 310 may be from a first source and comprise one or more of an identification of a person 182, a source of the request 184, and an indicator 186 indicating whether the first person is currently available. As described above in relation to FIG. 2, the identification 182 of the request 180 may be one or more of a phone number of a person, an email address of a person, a name of a person, a fax number of a person, and a geographic location of a person. The source 184 of the request 180 may be one or more of a phone call, an instant message, an email, and a website submission. Further, the source 184 may be a platform associated with the service or product provider or may be a platform associated with a third party. Additionally, the request 180 received at step 310 may include an indicator 186 regarding whether the person is currently available for communication. In some embodiments, after receiving the request at step 310, the method 300 continues through step 320.

At step 320, the phone dialer selection tool 150 assigns weights 222 to various portions of the request 180 received at step 310. For example, phone dialer selection tool 150 may assign a weight 222 to the identification of the person ($W_1$), the source ($W_2$), and the indicator ($W_3$). In some embodiments, the weights 222 are assigned based on information stored in memory 170. As an example, memory 170 may store a weight for each of a plurality of sources 170a and/or a weight for each of a plurality of indicators 170b. As another example, memory 170 may store historical data (e.g., 170c-e) about a first person (e.g., user 120). After phone dialer selection tool 150 assigns one or more weights 222 to the request 180, the method 300 may continue to a step 330.

At step 330, a prioritization factor 224 is calculated based on the weights 222 assigned at step 320. For example, if phone dialer selection tool 150 assigned a weight of 3 to the identification 182 of the request 180, assigned a weight of 10 to the source 184 of the request 180, and assigned a weight of 10 to the indicator 186 of the request 180, phone dialer selection tool 150 may determine that the prioritization factor 224 associated with the request 180 is 23. In some embodiments, calculating the prioritization factor 224 comprises summing each of the assigned weights 222 (e.g., $W_1+W_2+W_3$). The prioritization factor 222 may, in some embodiments, be calculated by assessment engine 220 of phone dialer selection tool 150. After determining the prioritization factor 224 of the request 180, the method 300 may continue to a decision step 340.

At decision step 340, phone dialer selection tool 150 determines whether the prioritization factor 224 is greater or equal to a threshold 170f. In some embodiments, the threshold 170f that the prioritization factor 224 is compared to is stored in memory 170. The threshold 170f may be fixed or variable and thus differ on a subsequent evaluation of a later call request 180. In some embodiments, assessment engine 220 of phone dialer selection tool 150 compares the prioritization factor 224 to threshold 170f. If phone dialer selection tool 150 determines at step 340 that the determined prioritization factor 224 is greater or equal to threshold 170f, the method 300 continues to step 350a. Alternatively, if at step 340, phone dialer selection tool 150 determines that the determined prioritization factor 224 is less than threshold 170f, the method 300 may continue to step 350b.

At step 350, the call request 180 is sent to a phone dialer 140. As illustrated in FIG. 3, if the method 300 proceeds from step 340 to step 350a, phone dialer selection tool 150 sends call request 180 to first dialer 140a. Alternatively, if the method 300 proceeds from step 340 to step 350b, phone dialer selection tool 150 sends call request 180 to second dialer 140b. In some embodiments, first dialer 140a may be associated with various benefits such as a shorter wait time and/or a higher quality of service relative to phone dialer 140b. After sending the request 180 to a phone dialer 140, the method may continue to a step 360.

At step 360, phone dialer selection tool 150 may receive input regarding requests. In some embodiments, the input received at step 360 comprises information about whether the request 180 was fulfilled. In some embodiments, phone dialer selection tool 150 determines that a request 180 was fulfilled by determining whether a call was placed from phone dialer 140. In other embodiments, phone dialer selection tool 150 determines that a request 180 was fulfilled by substantively analyzing whether the underlying request of user 120 was satisfied by an operator of phone dialer 140. The module of phone dialer selection tool 150 that receives input at step 360 may be, in some embodiments, verification engine 230 of FIG. 2. In some embodiments, after receiving input regarding the request at step 360, the method continues to step 370.

At step 370, phone dialer selection tool 150 updates memory based on the input received at step 260. For example, as depicted in FIG. 2, memory 170 of phone dialer selection 150 is updated. In some embodiments, only portions of memory 170 are updated. For example, only the historical data (e.g., 170c-e) stored in memory 170 is updated. In some embodiments, update engine 240 of phone dialer selection tool 150 performs the updating of memory 170. In some embodiments, after updating the memory, the method 300 continues to an end step 375.

FIG. 4 illustrates an example of a computer system 400. As described above, phone dialer selection tool 150 may be a program that is implemented by a processor of a computer system such as computer system 400. Computer system 400 may be any suitable computing system in any suitable physical form. As an example and not by way of limitation, computer system 400 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

One or more computer systems 400 may perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As an example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 may include a processor 410, memory 420, storage 430, an input/output (I/O) interface 440, a communication interface 450, and a bus 460 in some embodiments, such as depicted in FIG. 4. Although this disclosure describes and illustrates a particular computer system having a particular number of particular components in a particular arrangement, this disclosure contemplates any suitable computer system having any suitable number of any suitable components in any suitable arrangement.

Processor 410 includes hardware for executing instructions, such as those making up a computer program, in particular embodiments. For example, processor 410 may execute phone dialer selection tool 150 in some embodiments. As an example and not by way of limitation, to execute instructions, processor 410 may retrieve (or fetch) the instructions from an internal register, an internal cache, memory 420, or storage 430; decode and execute them; and then write one or more results to an internal register, an internal cache, memory 420, or storage 430. In particular embodiments, processor 410 may include one or more internal caches for data, instructions, or addresses. This disclosure contemplates processor 410 including any suitable number of any suitable internal caches, where appropriate. As an example and not by way of limitation, processor 410 may include one or more instruction caches, one or more data caches, and one or more translation lookaside buffers (TLBs). Instructions in the instruction caches may be copies of instructions in memory 420 or storage 430, and the instruction caches may speed up retrieval of those instructions by processor 410. Data in the data caches may be copies of data in memory 420 or storage 430 for instructions executing at processor 410 to operate on; the results of previous instructions executed at processor 410 for access by subsequent instructions executing at processor 410 or for writing to memory 420 or storage 430; or other suitable data. The data caches may speed up read or write operations by processor 410. The TLBs may speed up virtual-address translation for processor 410. In particular embodiments, processor 410 may include one or more internal registers for data, instructions, or addresses. This disclosure contemplates processor 410 including any suitable number of any suitable internal registers, where appropriate. Where appropriate, processor 410 may include one or more arithmetic logic units (ALUs); be a multi-core processor; or include one or more processors 175. Although this disclosure describes and illustrates a particular processor, this disclosure contemplates any suitable processor.

Memory 420 may include main memory for storing instructions for processor 410 to execute or data for processor 410 to operate on. As an example and not by way of limitation, computer system 400 may load instructions from storage 430 or another source (such as, for example, another computer system 400) to memory 420. Processor 410 may then load the instructions from memory 420 to an internal register or internal cache. To execute the instructions, processor 410 may retrieve the instructions from the internal register or internal cache and decode them. During or after execution of the instructions, processor 410 may write one or more results (which may be intermediate or final results) to the internal register or internal cache. Processor 410 may then write one or more of those results to memory 420. In particular embodiments, processor 410 executes only instructions in one or more internal registers or internal caches or in memory 420 (as opposed to storage 430 or elsewhere) and operates only on data in one or more internal registers or internal caches or in memory 420 (as opposed to storage 430 or elsewhere). One or more memory buses (which may each include an address bus and a data bus) may couple processor 410 to memory 420. Bus 460 may include one or more memory buses, as described below. In particular embodiments, one or more memory management units (MMUs) reside between processor 410 and memory 420 and facilitate accesses to memory 420 requested by processor 410. In particular embodiments, memory 420 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 420 may include one or more memories 180, where appropriate. Although this disclosure describes and illustrates particular memory, this disclosure contemplates any suitable memory.

Storage 430 may include mass storage for data or instructions. As an example and not by way of limitation, storage 430 may include a hard disk drive (HDD), a floppy disk drive, flash memory, an optical disc, a magneto-optical disc, magnetic tape, or a Universal Serial Bus (USB) drive or a combination of two or more of these. Storage 430 may include removable or non-removable (or fixed) media, where appropriate. Storage 430 may be internal or external to computer system 400, where appropriate. In particular embodiments, storage 430 is non-volatile, solid-state memory. In particular embodiments, storage 430 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 430 taking any suitable physical form. Storage 430 may include one or more storage control units facilitating communication between processor 410 and storage 430, where appropriate. Where appropriate, storage 430 may include one or more storages 140. Although this disclosure describes and illustrates particular storage, this disclosure contemplates any suitable storage.

I/O interface 440 may include hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 440 may include one or more device or software drivers enabling processor 410 to drive one or more of these I/O devices. I/O interface 440 may include one or more I/O interfaces 185, where appropriate. Although this disclosure describes and illustrates a particular I/O interface, this disclosure contemplates any suitable I/O interface.

Communication interface 450 may include hardware, software, or both providing one or more interfaces for communication (such as, for example, packet-based communication) between computer system 400 and one or more other computer systems 400 or one or more networks (e.g., network 110). As an example and not by way of limitation, communication interface 450 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 450 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 450 for any of these networks, where appropriate. Communication interface 450 may include one or more communication interfaces 190, where appropriate. Although this disclosure describes and illustrates a particular communication interface, this disclosure contemplates any suitable communication interface.

Bus 460 may include hardware, software, or both coupling components of computer system 400 to each other. As an example and not by way of limitation, bus 460 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 460 may include one or more buses 212, where appropriate. Although this disclosure describes and illustrates a particular bus, this disclosure contemplates any suitable bus or interconnect.

The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A phone dialer selection tool comprising:
   a network interface configured to receive a first request from a source, the first request comprising:
   an identification of a first person comprising one or more of a phone number of the first person, an email address of the first person, a fax number of the first person, and a geographic location of the first person;
   a source of the first request, wherein the source of the first request is one or more of:
   a phone call;
   an instant message;
   an email; and
   a website submission; and an indicator whether the first person is currently available for communication; and an assessment engine that is executable by at least one processor of an automatic call distributor, the assessment engine configured to:
assign a weight to each of the identification of the first person, the source, and the indicator whether the first person is currently available for communication, wherein the assigned weights are based on historical data about the first person;
sum each of the assigned weights to produce a prioritization factor;
in response to determining that the prioritization factor for the first request is above or equal to a threshold, send the first request to a first automated telephone dialer; and
in response to determining that the prioritization factor for the first request is below the threshold, send the first request to a second automated telephone dialer.

2. The phone dialer selection tool of claim 1, further comprising:
a verification engine configured to receive input about whether the request of the first person was fulfilled; and
an update engine configured to update the historical data based on the input received by the verification engine.

3. The phone dialer selection tool of claim 2, wherein:
the network interface is further configured to receive a second request from the first source;
the assessment engine is further configured to determine a prioritization factor for the second request, wherein determining the prioritization factor for the second request is based on the updated historical data.

4. The phone dialer selection tool of claim 1, further comprising a memory configured to store a plurality of identifications, wherein each identification comprises an identification of a person.

5. The phone dialer selection tool of claim 4, wherein:
the memory is further configured to store, for each identification of the plurality of identifications, a record of previous interactions;
the assessment engine is further configured to identify a record corresponding to the first person by comparing the identification of the first person to each identification of the plurality of identifications; and
the prioritization factor for the first request is based on the record corresponding to the first person.

6. The phone dialer selection tool of claim 4, wherein:
the memory is further configured to store, for each identification of the plurality of identifications, a class designation;
the assessment engine is further configured to identify a class designation corresponding to the first person by comparing the identification of the first person to each identification of the plurality of identifications; and
the prioritization factor for the first request is based on the class designation.

7. The phone dialer selection tool of claim 3, wherein the assessment engine does not send the first request to the first phone dialer or the second phone dialer based on a time that the first request was received relative to a time that a second request was received.

8. A method comprising:
receiving, by at least one processor of an automatic call distributor (ACD), a first request from a source, the first request comprising:
an identification of a first person comprising one or more of a phone number of the first person, an email address of the first person, a fax number of the first person, and a geographic location of the first person;
a source of the first request, wherein the source of the first request is one or more of:
a phone call;
an instant message;
an email; and
a website submission; and
an indicator whether the first person is currently available for communication; and
assigning, by the at least one processor, a weight to each of the identification of the first person, the source, and the indicator whether the first person is currently available for communication, wherein the assigned weights are based on historical data about the first person;
summing, by the at least one processor, each of the assigned weights to produce a prioritization factor;
sending, by the at least one processor, the first request to a first automated telephone dialer in response to determining that the prioritization factor for the first request is above or equal to a threshold; and
sending, by the at least one processor, the first request to a second automated telephone dialer in response to determining that the prioritization factor for the first request is below the threshold.

9. The method of claim 8, further comprising:
receiving input about whether the request of the first person was fulfilled; and
updating the historical data based on the input received by the verification engine.

10. The method of claim 8, further comprising:
receiving a second request from the first source; and
determining a prioritization factor for the second request, wherein determining the prioritization factor for the second request is based on the updated historical data.

11. The method of claim 8, storing a plurality of identifications in a memory, wherein each identification comprises an identification of a person.

12. The method of claim 11, further comprising:
storing, for each identification of the plurality of identifications, a record of previous interactions in the memory;
identifying a record corresponding to the first person by comparing the identification of the first person to each identification of the plurality of identifications; and
assigning a weight to the record corresponding to the first person.

13. The method of claim 11, further comprising:
storing, for each identification of the plurality of identifications, a class designation in the memory;
identifying a class designation corresponding to the first person by comparing the identification of the first person to each identification of the plurality of identifications; and
assigning a weight to the class designation corresponding to the first person.

14. The method of claim 8, further comprising not sending the first request to the first phone dialer or the second phone dialer based on the time that the first request was received relative to a time that a second request was received.

15. One or more computer readable non-transitory storage media embodying software that is operable when executed by at least one processor of an automatic call distributor to:
receive a first request from a source, the first request comprising:
an identification of a first person comprising one or more of a phone number of the first person, an email address of the first person, a fax number of the first person, and a geographic location of the first person;
a source of the first request, wherein the source of the first request is one or more of:
a phone call;
an instant message;
an email; and
a website submission; and
an indicator whether the first person is currently available for communication; and
assign a weight to each of the identification of the first person, the source, and the indicator whether the first person is currently available for communication, wherein the assigned weights are based on historical data about the first person;
sum each of the assigned weights to produce a prioritization factor;
send the first request to a first automated telephone dialer in response to determining that the prioritization factor for the first request is above or equal to a threshold; and
send the first request to a second automated telephone dialer in response to determining that the prioritization factor for the first request is below the threshold.

16. The media of claim 15, wherein the software is further operable when executed to:
receive input about whether the request of the first person was fulfilled; and
update the historical data based on the input received by the verification engine.

17. The media of claim 15, wherein the software is further operable when executed to:
receive a second request from the first source; and
determine a prioritization factor for the second request, wherein determining the prioritization factor for the second request is based on the updated historical data.

18. The media of claim 15, wherein the software is further operable when executed to store a plurality of identifications in a memory, wherein each identification comprises an identification of a person.

19. The media of claim 18, wherein the software is further operable when executed to:
store, for each identification of the plurality of identifications, a record of previous interactions in the memory;
identify a record corresponding to the first person by comparing the identification of the first person to each identification of the plurality of identifications; and
assign a weight to the record corresponding to the first person.

20. The media of claim 18, wherein the software is further operable when executed to:
store, for each identification of the plurality of identifications, a class designation in the memory;
identify a class designation corresponding to the first person by comparing the identification of the first person to each identification of the plurality of identifications; and
assign a weight to the class designation corresponding to the first person.

* * * * *